United States Patent [19]

Wright

[11] Patent Number: 5,215,191
[45] Date of Patent: Jun. 1, 1993

[54] COTTON BALE COVER

[76] Inventor: Herbert J. Wright, Rte. 4, Box 886, Decatur, Tex. 76324

[21] Appl. No.: 837,853

[22] Filed: Feb. 18, 1992

[51] Int. Cl.$^5$ .............................................. B65D 71/00
[52] U.S. Cl. .................. 206/83.5; 206/442; 66/195
[58] Field of Search ............ 206/83.5, 410, 417, 206/442; 66/192, 194, 195

[56] References Cited

U.S. PATENT DOCUMENTS 4,607  6/1846  Glover .................................. 66/195

Primary Examiner—David T. Fidei
Attorney, Agent, or Firm—John B. Hardaway, III; Jeffrey L. Wilson; J. Bennett Mullinax

[57] ABSTRACT

A cover is illustrated for confining in compression a bale of cotton being transported to a textile mill. The cover is warp knitted from cotton mote yarn spun on an open-ended apparatus, possesses a yarn count of 3 to 12 and is of Atlas stitch construction produced by using suitable lapping movements in conjunction with two or more partially-threaded guide bars.

6 Claims, 6 Drawing Sheets

BAR 1
1 IN, 1 OUT

BAR 2
1 OUT, 1 IN

READING

BAR 1            1 IN - 1 OUT

BAR 2            1 OUT - 1 IN

BAR 5            CONNECTOR            ENDS FULL
                                      ON SELVEDGE 0

BAR 3            1 IN - 1 OUT

BAR 4            1 OUT - 1 IN

BAR 1
1 IN - 1 OUT

BAR 2
1 OUT - 1 IN

BAR 1
1 IN - 1 OUT

BAR 2
1 OUT - 1 IN

BAR I
I IN – I OUT

BAR 2
I OUT – I IN

5,215,191

COTTON BALE COVER

BACKGROUND OF THE INVENTION

Covers for cotton bales have heretofore been constructed utilizing a woven jute construction. Such covers possess disadvantages in that they are relatively expensive and tend to contaminate the cotton with the jute fibers. Efforts to supply cotton bale covers having improved characteristics are illustrated in U.S. Pat. Nos. 3,647,061 and 3,674,139. Such covers are of laminated construction, however, and tend to be expensive, presenting further problems in that they are not sufficiently air permeable when the cotton is compressed for baling and tend to cause mildew. Ring spun yarn is impractical for use in the present application because of the high level of defects in the yarn making warp knitting impractical. By the use of open end spinning, it is possible to use a lower grade of cotton for the coarser counts and yet produce yarn of acceptable quality for warp knitting. Such fabrics may be made to any desired width and possess a true selvage. It is thus possible to produce a yarn consisting essentially of cotton and suitable to be used on warp knitting equipment for constructing a bale cover.

Normally, coarse yarn counts are not run on warp knitting machines especially when such yarns are constructed of lower quality fiber. Having determined that it is possible to run such yarn on warp knitting machines, it is necessary to find a stitch construction to meet the requirements of a bale cover. Cotton bale covers must maintain their shape and be substantially ravel proof so that the compressed bale will not deteriorate excessively, or the fiber of the bale contaminated, when the cover is cut for cotton sampling. In this connection in most warp knit fabrics, all ends are form connected whereas in woven fabrics, the ends are friction connected. Such construction utilizing coarse yarn counts provide suitable cover or opacity to protect and retain the fiber mass of the bale in compression. The yarns tend to keep separated maintaining spacing with less tendency for the yarns to bunch together. Moreover, such construction permits a design for balanced tear and tensile strength in both directions without overuse of one to achieve the other.

U.S. Pat. No. 4,071,138 to Wright discloses a cotton bale cover of warp knit possessing a balance of stretch characteristics in both directions and suitable absorption properties, and which is substantially ravel-proof. However, Wright teaches a cover knitted from a higher grade of cotton which adds to the expense of baling.

Further, the prior art teaches covers having external restraints which fixes the cover in place. Product sampling of the bale contents therefore requires a hole to be cut into the cover for sample removal, followed by the repair of the cover. In addition, should a restraint band break, prior art covers and restraining means requires that the bag be rebaled and rebanded.

Therefore, there is much room for improvement and variation within the art.

SUMMARY OF THE INVENTION

It is thus an object of this invention to provide an improved cotton bale cover which possesses a balance of stretch characteristics, suitable absorption properties and is substantially ravel-proof, whose construction provides conformity to the cylindrical shape of the bale, helping to confine the bale in compression.

It is a further object of this invention to provide a improved cotton bale cover which is compatible with the bale of cotton so as to avoid contamination thereof.

It is a further and more particular object of this invention to provide an improved cotton bale cover which is formed by a cotton waste product.

It is still a further and more particular object of this invention to provide an improved cotton bale cover which can keep the bale in compression following failure of an interior restraint.

It is still a further and more particular object of this invention to provide an improved cotton bale cover which permits product sampling of the compressed bale fibers without cutting the cover.

It is still a further and more particular object of this invention to provide an improved cotton bale cover which permits rebanding of a failed restraint without having to rebag the bales.

These, as well as other objects are accomplished by a bale of cotton having a cover thereon comprising a predetermined mass of cotton fibers contained and confined in compression in the form of a bale for transport, a cover enshrouding the mass of fibers formed of cotton mote yarn or other low grade cotton warp knitted into a fabric by the use of two or more guide bars with part-set threading, the yarn being spun on an open-end spinning apparatus and possessing a coarse yarn count of from 3 to 12 Numbers English (Ne), the fabric warp knitted from said yarn in the Atlas stitch construction and being porous and air permeable to avoid mildew of the mass of cotton fibers within the bale, the fabric being stretchable and stable in all directions and particularly in the direction of the wale and biases to aid in maintaining compression of the bale, and the cotton mote yarn of the cover engaging the mass of cotton fibers being compatible therewith avoiding contamination thereof.

DETAILED DESCRIPTION OF THE DRAWINGS

Figure 1:
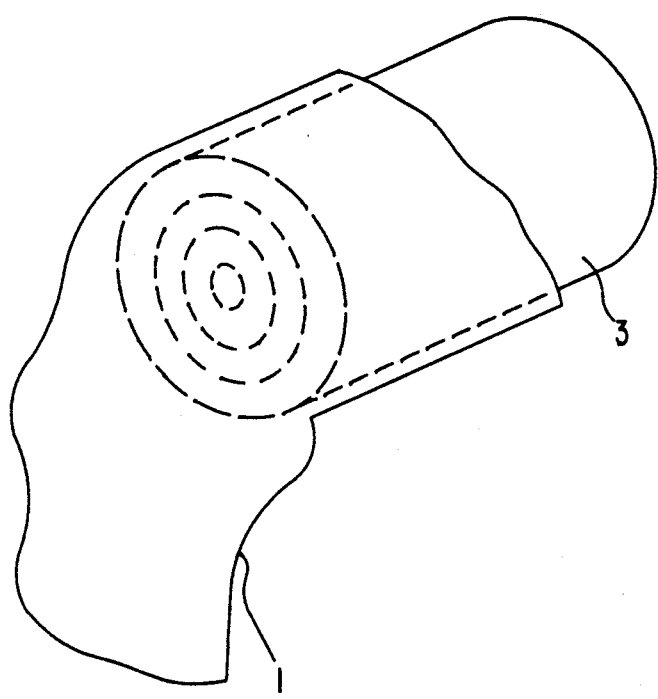
FIG. 1 of the drawings is a perspective view illustrating the improved cotton bale cover in accordance with this invention in conjunction with a cylindrical bale of cotton in compression.

In accordance with this invention, it has been found that the improved cotton bale cover described herein for use in transporting ginned cotton fibers to a textile mill contains and confines in compression a predetermined mass of cotton fibers. Cotton mote yarn, a low-grade yarn which is normally a waste product, is spun on an open end spinning apparatus so as to possess a yarn count of from 3 to 12 Ne. Dependent upon the yarn size utilized, the number of courses per inch of fabric length is selected to obtain a tight loop, achieving reasonable fabric stability. The fabric of the cotton bale cover is warp knitted from the yarn in an Atlas stitch construction, producing an expandable knit with staggered wales for additional strength and minimum raveling. The fabric is formed into a tube with one open end, i.e., is of construction similar to a tube sock, which is pulled onto and conforms to the cylindrical shape of the bale of cotton. Use of a double needle bar machine allows the direct knitting of the desired tube. However, a tube can also be formed by sewing the sides of flat fabric together. The cover stretches to enshroud the bale and the tightens in conformity to the bale due to the particular construction stitch employed which serves to reduce the diameter of the cover at the time of forced elongation The cotton yarn of the cover engages the mass of cotton fibers of the bale in suitable compression avoiding contamination and is porous and air permeable with suitable absorption properties to avoid mildew of the bale of cotton.

An advantage of the open ended tube design permits the tube, having no external restraint, to be partially rolled back from the compressed bale thereby permitting product samples to be removed from the bale. Following the sample removal, the cover is simply repositioned. This is an important improvement over prior art covers which required a hole to be cut in the cover followed by the subsequent repair of the cover.

A further advantage of the cotton bale cover is the cover's ability to maintain compressive forces on the bale should an interior restraint band break. Heretofore, a broken band required the bale to be rebagged and then rebanded. With the present invention, the broken restraint band can be removed through a small hole cutting the cover, allowing the bale to be rebanded within the cover. This ability eliminates costly delays and re-bagging expenses.

It is desirable to have a degree of stretch in bale wrapping fabric as is provided by Atlas stitch construction. The fabric of the cotton bale cover of the instant invention constructed by Atlas stitch construction is an open-work fabric, produced in warp knitting by using suitable lapping movement in conjunction with two or more partially-threaded guide bars, i.e, an order of threading in which certain guides of both bars are left empty. The paths of the warp threads are arranged so that certain wales are not connected at each course. The openings in the fabric staggered successively right and left, occur at points where there is no side connection between adjacent wales. The size of the openings is dependent upon the number of courses during which no lateral connections are effected and the shape of the openings is somewhat controlled by a variation of the lapping movements at the end of each opening. In accordance with this invention, the guide bars, making similar movements in opposite directions to produce the Atlas stitch, make underlaps across two or more needle spaces to reach the new positions for producing the openings between different wales. A variety of different warp entries can produce the open-work effect, providing stretch characteristics appropriate to the purposes of containing and confining a predetermined mass of cotton, while maintaining strength and stability in all directions.

Warp knitted rib fabrics may be produced by using two needle bars, generally resulting in a fabric that is heavier and thicker than those made on a single needle bar. Open-work rib fabric is one effect which can be obtained in this manner. The guide bar motions are applicable to the front bed needles and/or to the back bed needles as demonstrated in successive horizontal lines in point diagrams.

When two guide bars are used in conjunction with two needle beds, the patterning scope of the machine is tremendously increased. For example, the front guide bar may make overlaps on both the front and back needle beds. Concurrently, the back guide bar may make underlaps across several needles before each course is knitted on the back bed needles, allowing the necessary connections between chains of loops knitted by the front bar threads. During the next complete course(s), the functions of the bars may be reversed. By using two bars for each side and a fifth and/or sixth bar to join the fabric sides together, the desired tube is formed. The patterns effected are of infinite variety.

Warp knitted rib net fabrics may be produced when partial sets of threads are used in both guide bars. The simplest net fabrics are produced when alternate guides are threaded in both bars. Side connections are not made between corresponding rib wales or between adjacent plain wales for one or more complete courses in order to introduce a definite opening into the fabric.

At the time a particular fabric is being knitted, a non-woven material or other web, e.g. a fleece filler, may be horizontally fed into the warp knitting machine. Thus, the knitting action incorporates the fleece filler to make it a part of the produced fabric as referenced in *LIBA, COPCENTRA-HS, -HKS, -HV; Systems of Automatic Warp Knitting Machines with Full Width Weft Insertion* and *Mayer Welt Insertion Machines*. This resulting integrated fabric is stronger due to its overall surface, yet it retains the flexibility provided by the open-weave. Such construction is a desirable option for a cotton bale cover. These as well as other advantages will be apparent from the following description and reference to the figures of drawing.

FIG. 1 of the drawings illustrates the improved cotton bale cover 1 in conjunction with a cylindrical bale of cotton 3 in compressed state.

Figure 2:
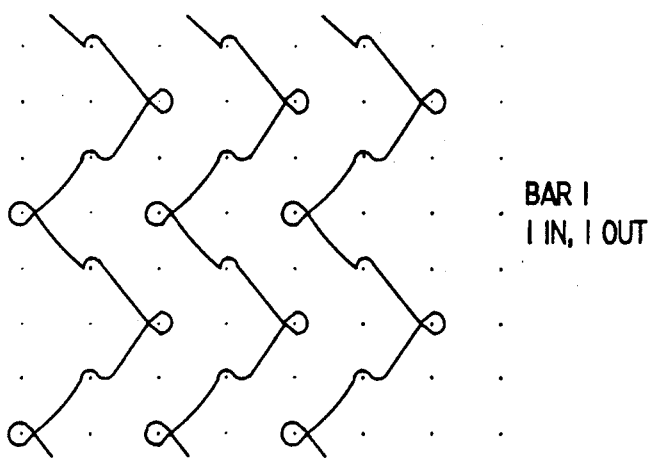
FIG. 2 of the drawings is a point diagram for the fabric construction in accordance with this invention using an open/closed stitch construction.
Figure 2:
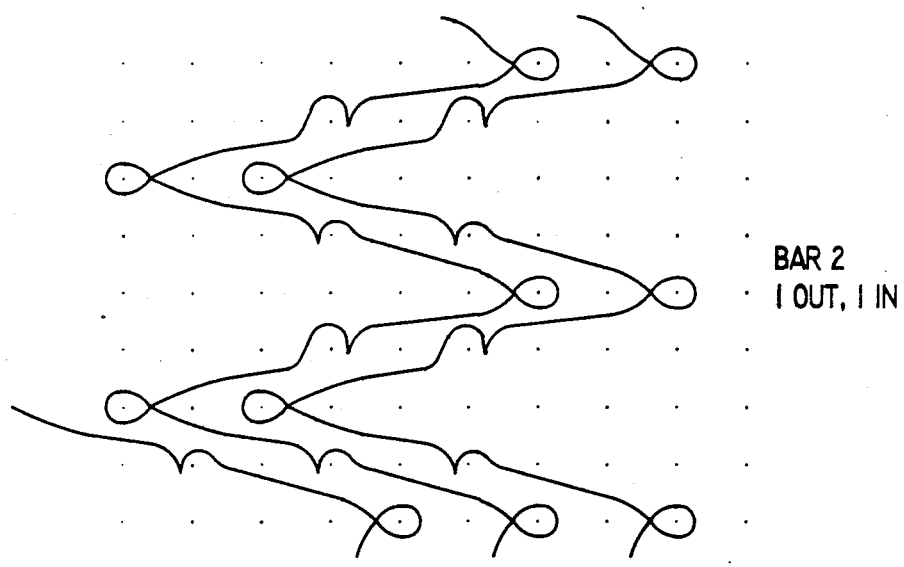
Figure 2:
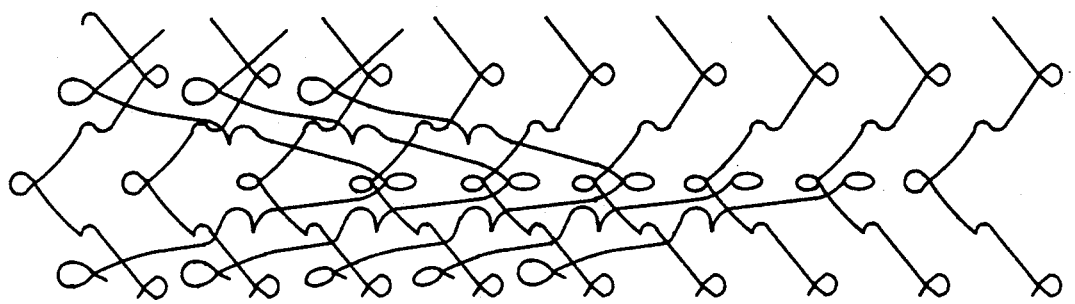

In FIG. 2 of the drawings, a point diagram for the fabric construction in accordance with this invention is provided. In Bar 1, the first and odd numbered guides are threaded whereas the second and even numbered guides are left empty. In Bar 2, the first and odd numbered guides are empty while the second and even numbered guides are threaded.

Figure 3:
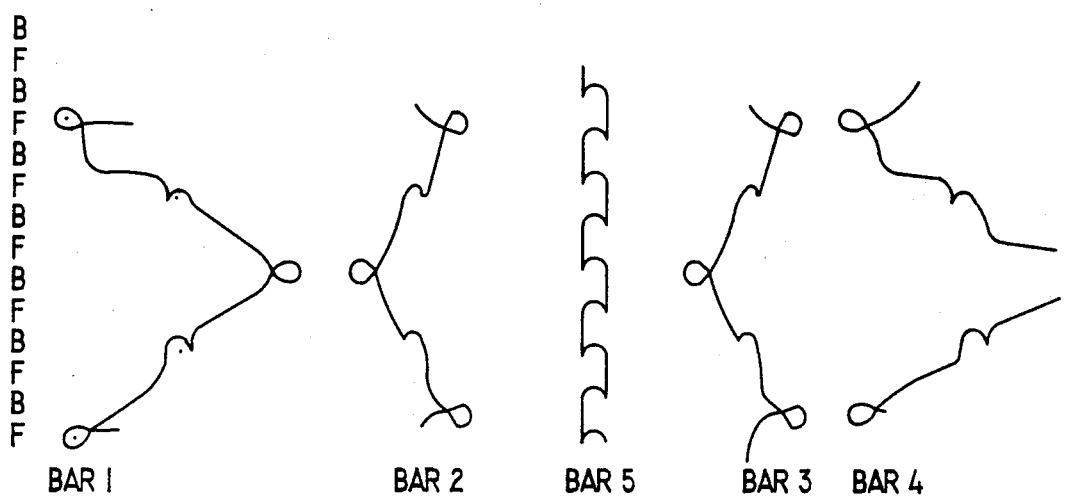
FIG. 3 of the drawings is a point diagram of a double needle bar construction for the fabric construction in accordance with this invention.

In FIG. 3 of the drawings, the point diagram for the fabric of a double needle bar construction in accordance with this invention is illustrated. Because two needle bars are employed in the production of rib fabrics, two horizontal lines of points are used for indicating the lapping movements for each completed course.

Figure 4:
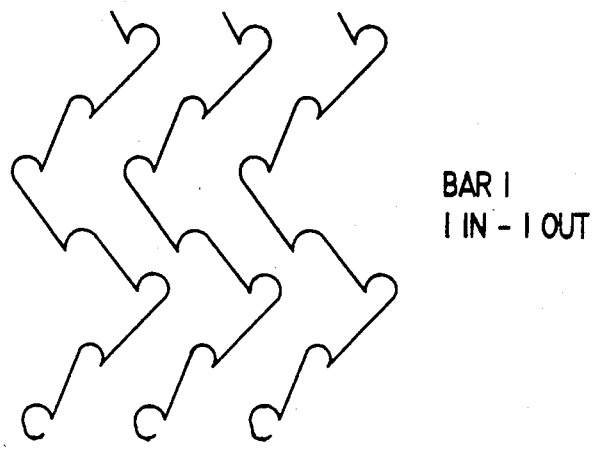
FIG. 4 of the drawings is a point diagram for the fabric constructed in accordance with this invention using all open stitch construction.
Figure 4:
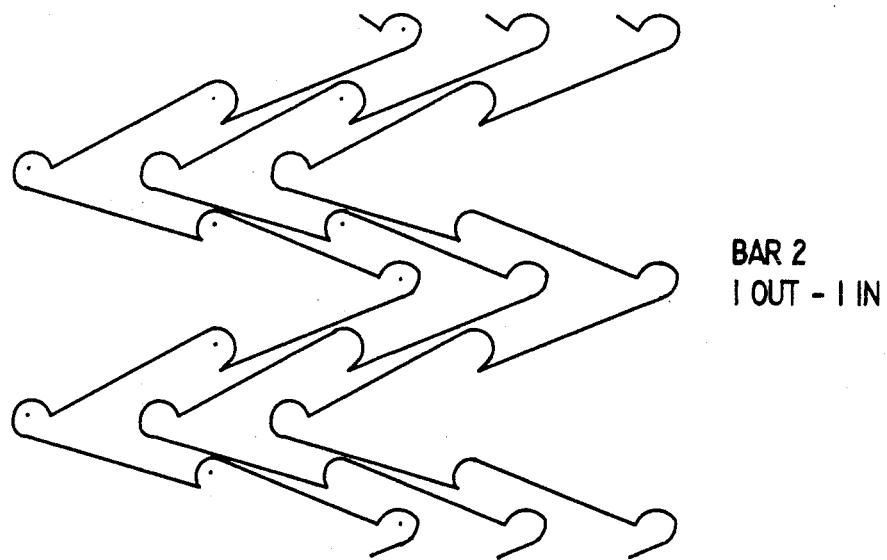

In FIG. 4, an additional point diagram for an embodiment of the fabric constructed in accordance with this invention is provided. In this embodiment, an all open stitch construction is provided. In bar 1, the first and odd number guides are threaded whereas, the second and even number guides are left empty. In bar 2, the first and odd number guides are empty while the second and even number guides are threaded.

Figure 5:
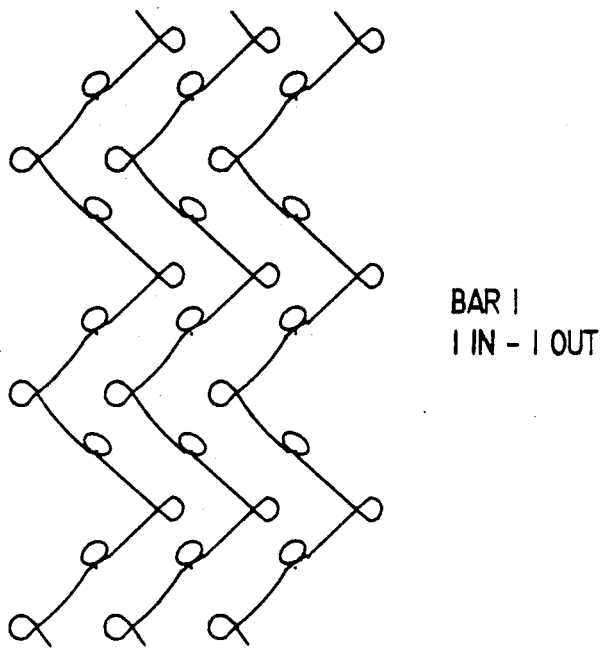
FIG. 5 of the drawings is a point diagram for the fabric constructed in accordance with this invention using all closed stitch construction.
Figure 5:
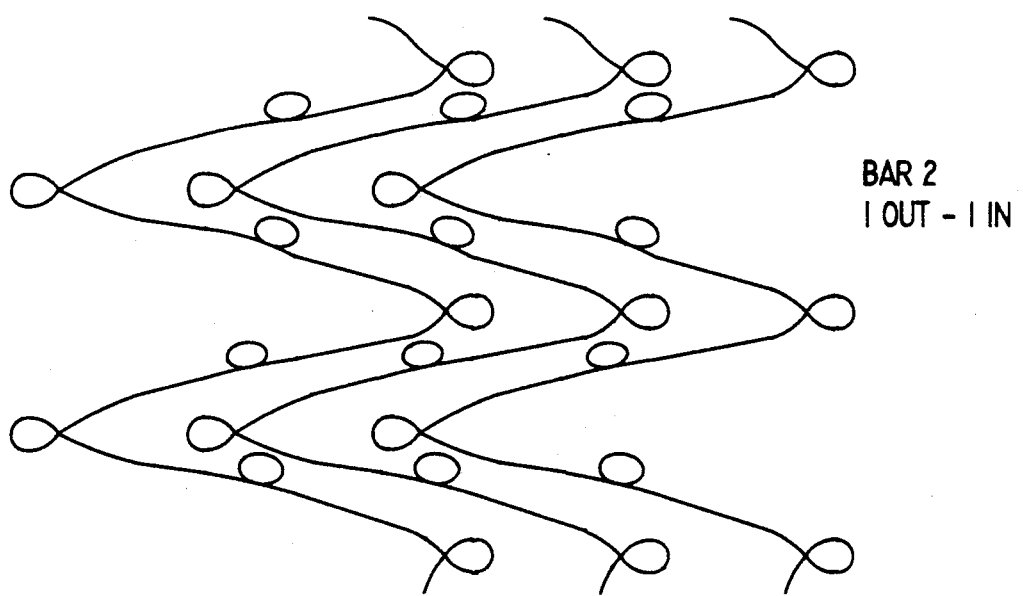
Figure 6:
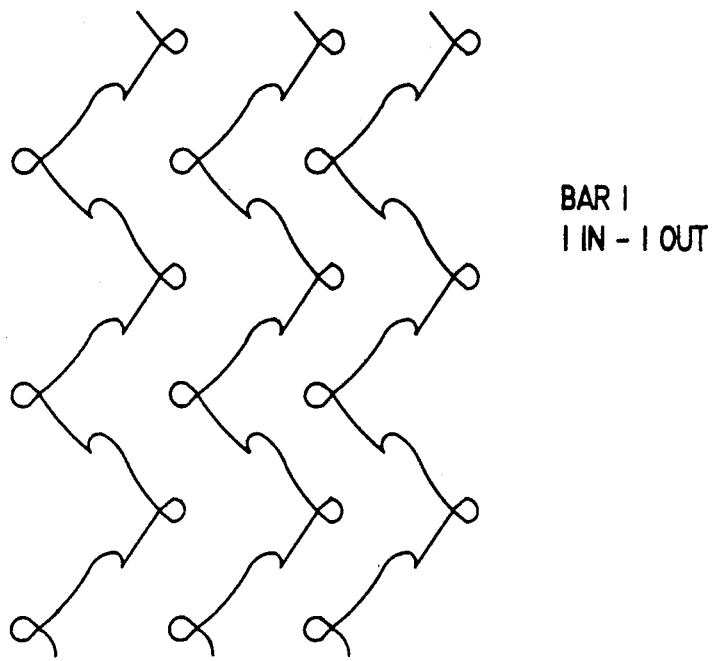
FIG. 6 of the drawings is a point diagram for the fabric constructed in accordance with this invention using a combination of an open/closed stitch with an all closed stitch.
Figure 6:
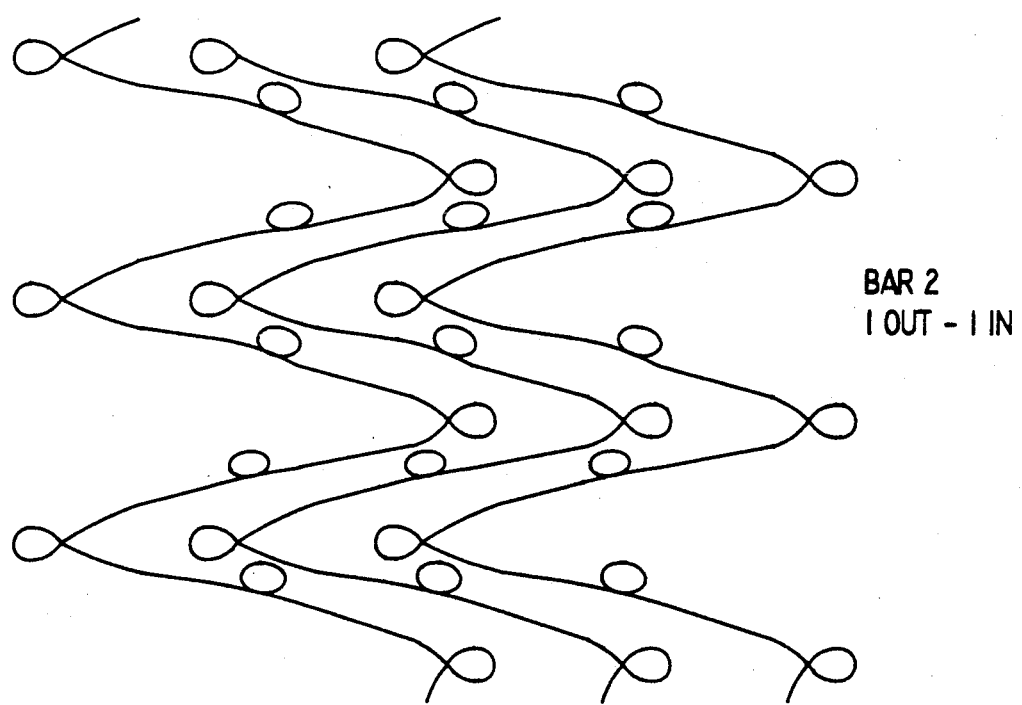

FIG. 5 is similar to FIG. 4 except that all closed stitch construction is provided, while in FIG. 6, another embodiment of the fabric construction is shown in which an open/closed stitch is used in one bar (bar 1) and all closed stitch is used in the other bar (bar 2).

As shown in FIG. 3, the fabric is started with an underlap for the front needle bed (F) and, likewise, all odd horizontal rows of points indicate the lapping movements made on the front bed needles. Similarly, all even horizontal rows show the guide bar motions applicable to the back needle bed (B). The construction of FIG. 3 is two constructions as seen in FIG. 2, one being made with Bar 1 and Bar 2 and the other produced from Bar 4 and Bar 5. The selvage on Bar 3 then ties the separate constructions together.

A similar fabric construction ca be used with either the all open stitch construction seen in FIG. 4, the all closed stitch construction seen in FIG. 5, or a combination of one open/closed stitch with an all closed stitch seen in FIG. 6. Though not shown, an open/closed stitch on one bar can be combined with an all open stitch on another bar.

It is seen that the stretch characteristics of the fabric of the instant invention allow conformity to the cylindrical shape of a compressed bale of cotton, enshrouding it during transport without the need of further external restraints. It is further seen that the fabric of the instant invention is derived from a cotton waste product and is compatible with the fibers of the bale of cotton, avoiding contamination of the bale. The fabric has also been shown to posses suitable absorption properties and is substantially ravel-proof.

It should be noted that the detailed description and specific examples which indicate the presently preferred embodiment of the invention are given by way of illustration only. While the above description of the preferred embodiment is presented in regard to a cover suitable for cotton bales, it is understood that variations of the invention can be directed toward other fiber bales such as those of wool. As many variations and modifications will be apparent to one of skill in the art from a reading of the above specification, such variations are within the spirit and scope of the instant invention as defined by the following appended claims.

That which is claimed is:

1. A cover for engaging the exterior of a compressed mass of fibers comprising:
    a predetermined mass of fibers contained and confined in compression in the form of a bale for transport;
    a cover enshrouding the mass of fibers, said cover formed of yarn warp knitted into a fabric by use of two guide bars with part-set threading;
    said yarn knitted into said fabric being spun on an open-end spinning apparatus and possessing a coarse yarn count of from 3 to 12;
    said fabric being warp knitted from said yarn in Atlas stitch construction;
    said fabric being porous and air permeable to avoid mildew of said mass of fibers within said bale;
    said fabric being stretchable and stable in all directions and particularly in the direction of the wale and biases to aid in maintaining compression of said bale; and
    said yarn of said cover engaging said mass of fibers being compatible therewith avoiding contamination thereof.

2. A bale of cotton having a cover thereon comprising:
    a predetermined mass of cotton fibers contained and confined in compression in the form of a bale for transport;
    a cover enshrouding the mass of fibers, said cover formed of cotton mote yarn warp knitted into a fabric by use of two guide bars with part-set threading;
    said yarn knitted into said fabric being spun on an open-end spinning apparatus and possessing a coarse yarn count of from 3 to 12;
    said fabric being warp knitted from said yarn in Atlas stitch construction;
    said fabric being porous and air permeable to avoid mildew of said mass of cotton fibers within said bale;
    said fabric being stretchable and stable in all directions and particularly in the direction of the wale and biases to aid in maintaining compression of said bale; and
    said cotton mote yarn of said cover engaging said mass of cotton fibers being compatible therewith avoiding contamination thereof.

3. The bale of cotton having a covering thereon in accordance with claim 2 wherein said predetermined mass of cotton fibers is compressed into generally cylindrical shape.

4. The bale of cotton having a covering thereon in accordance with claim 2 wherein said cover further comprises a fabric of warp knitted threads having been knitted through a fleece filler or other web to form an integrated fabric construction.

5. The bale of cotton having a covering thereon in accordance with claim 2 wherein said cover is knitted into a fabric by the use of plurality of guide bars with part-set threading.

6. The cover according to claim 1 wherein said fabric is in the form of a cylindrical tube.

* * * * *